Figures 1, 2:
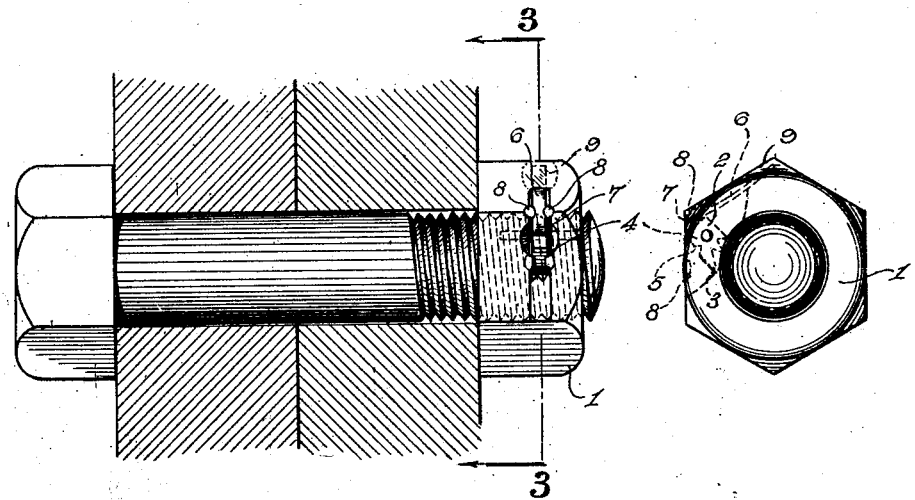

J. L'ACHANCE.
NUT LOCK.
APPLICATION FILED JAN. 24, 1913.

1,114,774.

Patented Oct. 27, 1914.

JOSEPH LACHANCE
Inventor

Witnesses:

By

Attorneys

UNITED STATES PATENT OFFICE.

JOSEPH LACHANCE, OF BEAUCEVILLE, QUEBEC, CANADA, ASSIGNOR OF ONE-HALF TO JOSEPH A. BILODEAU, OF MONTREAL, CANADA.

NUT-LOCK.

1,114,774.     Specification of Letters Patent.     Patented Oct. 27, 1914.

Application filed January 24, 1913. Serial No. 743,934.

*To all whom it may concern:*

Be it known that I, JOSEPH LACHANCE, a subject of the King of Great Britain, residing at Beauceville, Province of Quebec, Canada, have invented certain new and useful Improvements in Nut-Locks; and I do hereby declare that the following is a full, clear, and exact description of the invention, such as will enable others skilled in the art to which it appertains to make and use the same.

The invention to be hereinafter described relates to nut locks.

In order to more clearly disclose the construction, operation, and use of the invention, reference should be had to the accompanying drawings forming part of the present application.

Throughout the several figures of the drawings like reference characters designate the same parts.

Figures 3, 4:
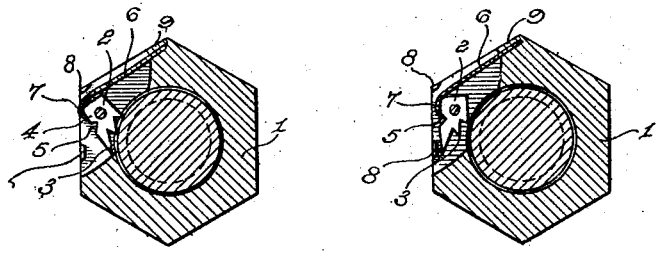

In the drawings: Figure 1 is a side elevation, as applied; Fig. 2 is a top plan view; Fig. 3 is a cross section on line 3—3 of Fig. 1, with the dog in operative position; and Fig. 4 is a like view with the dog in inoperative position.

Referring to the drawings in detail, 1 indicates a nut provided with a wide cut extending through one face from the outside to and into the threaded bore for the bolt. In this cut is pivotally mounted a dog 2 having bolt-engaging teeth 3, a rectangular shoulder 4, and a notch 5. A leaf spring 6 with a curved free end 7 bears upon the dog 2 and keeps it in operative position, as in Fig. 3. The length and position of the spring are such as to have the tip bear upon the side of the shoulder 4 at a point just beyond the pivot or fulcrum and force the teeth into engagement with the bolt threads, normally. The teeth are adapted to engage the threads only when the nut is being turned off or unscrewed, whereas, they permit the threads to pass freely when the nut is being turned on. Therefore, in order to remove the nut, it is necessary to hold the dog in the inoperative position of Fig. 4. This is accomplished by forcing the dog back from the position of Fig. 3 to that of Fig. 4, against the action of the spring. As it reaches the position of Fig. 4, the flat part of the spring near the tip will bear on the adjacent face of the rectangular shoulder 4 and the curved tip will extend down into the notch 5. Thus, the dog will be securely held in inoperative position and can be returned to operative position only by pressure counteracting the force of the spring.

In order to limit the outward movement of the dog and the free end of the spring, stop lugs 8 are provided, struck up from the opposite edges of the cut. The fixed or stationary end of the spring is held in position by means of lugs 9 similarly formed.

It is thought that the construction, operation, and use of the invention will be clear from the preceding detailed description.

Having thus fully described my invention, what I claim as new and desire to secure by Letters Patent is:

In a device of the character described; a nut provided with a cut extending from its periphery through the bolt passage; a toothed dog pivotally mounted in said cut and adapted to be projected into the bolt passage, said dog being operative in an arc of 45°, and having a rectangular shoulder, and a notch adjacent thereto; limiting lugs struck up from each face of the cut, opposite the dog; and a leaf spring secured in said cut and provided with a curved end adapted to press on the outer face of the rectangular shoulder of the dog, at a single point beyond the pivotal point thereof to hold the dog in operative position, the said curved end of the spring being adapted to fit around the corner and into the notch of the dog to hold it in inoperative position, and to coöperate with the aforementioned lugs to prevent projection of the dog beyond the side of the nut.

In witness whereof I have hereunto set my hand in the presence of two witnesses.

JOSEPH LACHANCE.

Witnesses:
   J. EPHR. BIDARD,
   C. F. MORIN.